United States Patent [19]
Ten Caat et al.

[11] Patent Number: 6,101,734
[45] Date of Patent: *Aug. 15, 2000

[54] DEVICE TO BE FASTENED TO A FREE END OF A MEASURING TAPE

[75] Inventors: Harm Ten Caat, CX Klazinaveen; Gezinus Kuiper, HE Schoonebeek, both of Netherlands

[73] Assignee: Lufkin Europe B.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,133

[22] Filed: Oct. 7, 1997

[30] Foreign Application Priority Data

Oct. 21, 1996 [EP] European Pat. Off. .............. 96202899

[51] Int. Cl.⁷ ....................................... G01B 3/10
[52] U.S. Cl. ................................................ 33/770
[58] Field of Search ....................................... 33/770, 758

[56] References Cited

U.S. PATENT DOCUMENTS

| | | | |
|---|---|---|---|
| Re. 14,947 | 9/1920 | Ballou | 33/770 |
| 1,102,436 | 7/1914 | Richardson | 33/770 |
| 2,629,935 | 3/1953 | Roe | 33/770 |
| 2,770,883 | 11/1956 | Hackney | 33/770 |
| 3,913,233 | 10/1975 | Marcell | 33/770 |
| 4,305,206 | 12/1981 | Roe | 33/770 |
| 4,466,194 | 8/1984 | Rutty | 33/770 |
| 4,930,227 | 6/1990 | Ketchpel | 33/770 |
| 5,010,657 | 4/1991 | Knapp | 33/770 |
| 5,600,894 | 2/1997 | Blackman et al. | 33/770 |

FOREIGN PATENT DOCUMENTS

| | | |
|---|---|---|
| 79096 | 5/1983 | European Pat. Off. .............. 33/770 |
| 2 669 997 | 11/1990 | France . |
| 940497 | 10/1963 | United Kingdom . |
| 1080402 | 8/1967 | United Kingdom . |
| 1109359 | 4/1968 | United Kingdom . |

*Primary Examiner*—G. Bradley Bennett
*Attorney, Agent, or Firm*—Coats & Bennett, P.L.L.C.

[57] ABSTRACT

A device for attaching to a free end of a measuring tape includes at least two substantially plate-shaped parts which can be fitted together. The free end of the measuring tape is secured between the two parts. One of the plate-shaped parts should include a flat side corresponding with the zero point of the scale indication on the measuring tape and the device may optionally include a hook for gripping objects to be measured. The plate-shaped parts cooperate to secure and properly align the end of the measuring tape without deforming the tape, thereby increasing operating life.

18 Claims, 4 Drawing Sheets ns of objects can be measured in a highly accurate manner with a measuring tape provided with the known device, that is, that in the operating position the hook (the inner side thereof) will continue to coincide very precisely with the zero point of a scale indication provided on the measuring tape during the entire life of the device. In this connection it is noted that the relevant EC-regulations in this field are very strict, whereby only measuring tapes provided with high-quality devices of the aforesaid type are awarded a stamp.

DEVICE TO BE FASTENED TO A FREE END OF A MEASURING TAPE

The invention relates to a device intended for being attached to a free end of a measuring tape, which device comprises at least two at least substantially plate-shaped parts which can be fitted together, between which parts the free end of the measuring tape can be provided.

A device of this kind is known from European patent publication No. 0 079 096 (Stanley-Mabo), wherein use is made of a hook which can pivot between a position of rest and an operating position. The known device is used in so-called "one man operation", which means that a user is able to place the hook on an object to be measured, walk to one end of the object with a reel on which the other end of the measuring tape is coiled and read the dimension of said object from the measuring tape himself, all this without any help. The device known from the aforesaid European patent is in particular used in the field of land surveying, the construction industry and the like. It will be apparent that it is of the utmost importance that dimensions of objects can be measured in a highly accurate manner with a measuring tape provided with the known device, that is, that in the operating position the hook (the inner side thereof) will continue to coincide very precisely with the zero point of a scale indication provided on the measuring tape during the entire life of the device. In this connection it is noted that the relevant EC-regulations in this field are very strict, whereby only measuring tapes provided with high-quality devices of the aforesaid type are awarded a stamp.

One drawback of the known device is that the measuring accuracy becomes less, especially after some time, as a result of which the statutory requirements are no longer met. This is caused by the fact that the known device uses fixed rivet pins which are passed through openings in the plate-shaped parts and the measuring tape, whereby the measuring tape is subsequently clamped down between the plate-shaped parts by upsetting the rivet pins. Said upsetting may either result in damage being done to the measuring tape (hair cracks), or in small spaces remaining between the rivet pins and the measuring tape.

An object of the invention is to provide a device to be attached to a free end of a measuring tape without play, and in order to accomplish that objective a device of the kind referred to in the introduction is characterized in that at least one of said plate-shaped parts is provided with means for matching the free end of said measuring tape between said parts without any deformation thereof. Preferably said means comprise a cam to be passed through an opening in the measuring tape, as well as at least one (more in particular two) contact surface for the cam positioned opposite said cam. As a result of this the measuring tape is "retained" between the two plate-shaped parts in a dimensionally stable manner. In some embodiments the cam has a substantially rectangular cross-section and the opening in the measuring tape is correspondingly shaped. By avoiding the use of rivet pins, measuring tape is prevented and insignificant play will remain between the measuring tape and the parts forming the connection. Preferably a free end of at least one of said parts comprises a flat side corresponding with the zero point of a scale indication provided on the measuring tape, and a hook is provided, which is movable between a position of rest and an operating position, said hook in the position of rest extending at least substantially parallel to the measuring tape to be attached and in operating position extending at least substantially perpendicularly thereto, with its inner side at least substantially coinciding with the zero point of a scale indication provided on the measuring tape. Instead of using a hook it will also be possible to use a lip or the like, of course. This makes a measuring tape fitted with the present invention suitable for use in the aforesaid "one man operation".

It is noted that the present invention is not limited to use in "one man operation", but that it may also be used in combination with a measuring tape for "two men operation". The device according to the invention is thereby attached to a free end of a measuring tape, whereby the zero point of a scale indication provided thereon is preceded by a blank starting piece, Said starting piece is thereby engaged by the present device. It will be apparent that in this manner a dimension of an object to be measured must be determined by two users.

In a preferred embodiment of a device according to the invention the plate-shaped parts are capable of matching the free end of the measuring tape by means of a wedging action. More in particular, one part thereby comprises a pin provided with a wedging surface, which pin can be passed through an opening in the other part, whilst the edge of the opening in said other part comprises a corresponding wedging surface for mating with the wedging surface of said pin. Preferably said pin is the aforesaid cam. It is noted that it is not necessary for both parts to have a wedge-shaped surface; it is also possible for only one of the two to have a wedge-shaped surface. In order to facilitate the fitting together of the plate-shaped parts, said parts are preferably formed with intermating centering or positioning surfaces, as will be explained in more detail hereafter.

In another preferred embodiment of a device according to the invention said plate-shaped parts are at least substantially made of plastic material. The advantage of this is that plastic exhibits hardly any shrink, if at all, so that the material itself will not contribute towards any measuring variations that may occur.

The invention also relates to a measuring tape provided with a device according to the invention.

The invention will be explained in more detail with reference to Figures shown in a drawing, in which.

Figure 1:
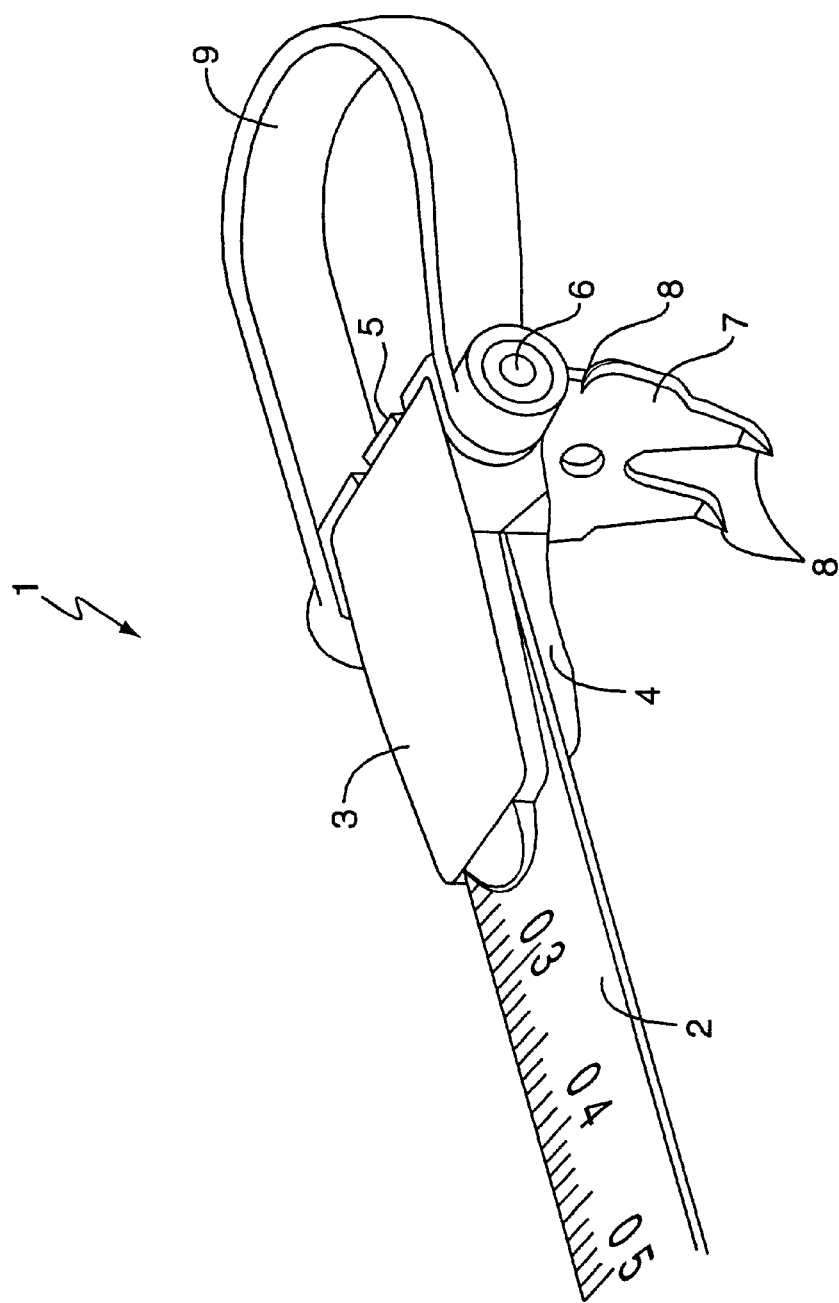
FIG. 1 is a perspective view of a measuring tape provided with a device according to the invention.

FIG. 1 shows a preferred embodiment of a device 1 according to the invention, which device is attached to a free end of a measuring tape 2. Said measuring tape 2, which will have a length of in particular 10 meters or more in practice, is at its other end coiled on a reel (not shown). The device 1 consists of two at least substantially plate-shaped parts which are fitted together, between which the free end of measuring tape 2 is provided. A scale indication provided on measuring tape 2 continues—possibly imaginarily so—on the at least substantially plate-shaped part 3, in such a manner that a flat side 5 at the free end of said part 3 corresponds with the zero point of the scale indication provided on measuring tape 2. Hereinafter the at least substantially plate-shaped parts 3,4 may be referred to as upper late 3 and lower plate 4. The two plates 3,4 have corresponding holes, through which a pivot pin 6 is passed in order to allow a hook 7 to pivot thereabout. FIG. 1 shows hook 7 in an operating position, in which it extends perpendicularly to measuring tape 2 and in which its inner side coincides with the zero point of the aforesaid scale indication provided thereon. Hook 7 can be pivoted from the operating position to a position of rest, in which it extends parallel to measuring tape 2. Hook 7 has projecting teeth 8, which function to enhance its grip on an object to be measured. Device 1 furthermore comprises a pull loop 9 mounted on pivot pin 6, so that the user need not take hold of the unit by the hook 7 with the risk of his fingers being injured by the teeth 8.

Figure 2:
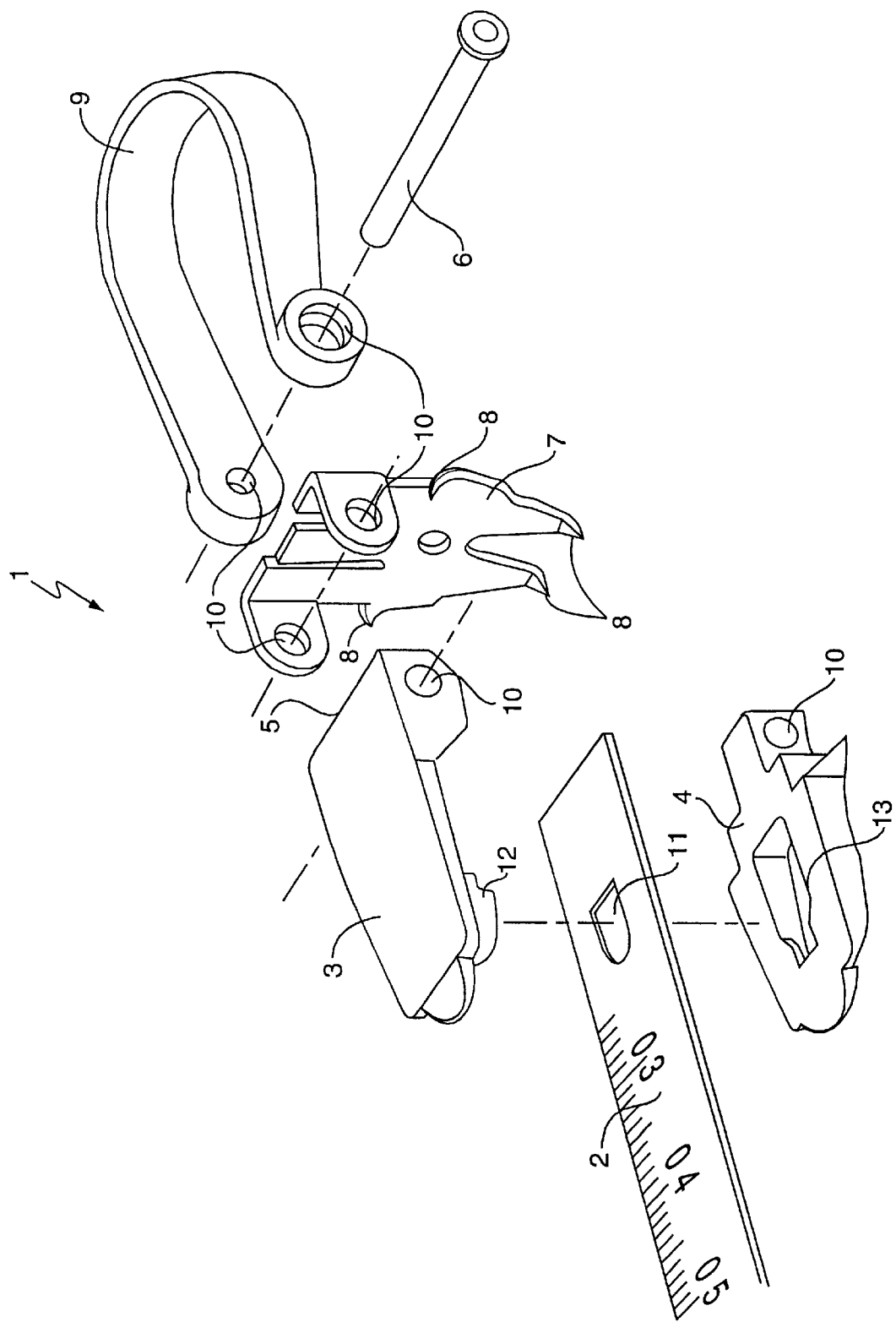
FIG. 2 is an exploded perspective view of the measuring tape comprising the device of FIG. 1.

FIG. 2 is an exploded view of the device 1 and the measuring tape 2 attached thereto, wherein parts corresponding with those of FIG. 1 are indicated by the same numerals. In FIG. 2 the holes formed in upper plate 3, lower plate 4, hook 7 and pull loop 9 for accommodating pivot pin 6 are all indicated by numeral 10 for easy reference.

Figure 3:
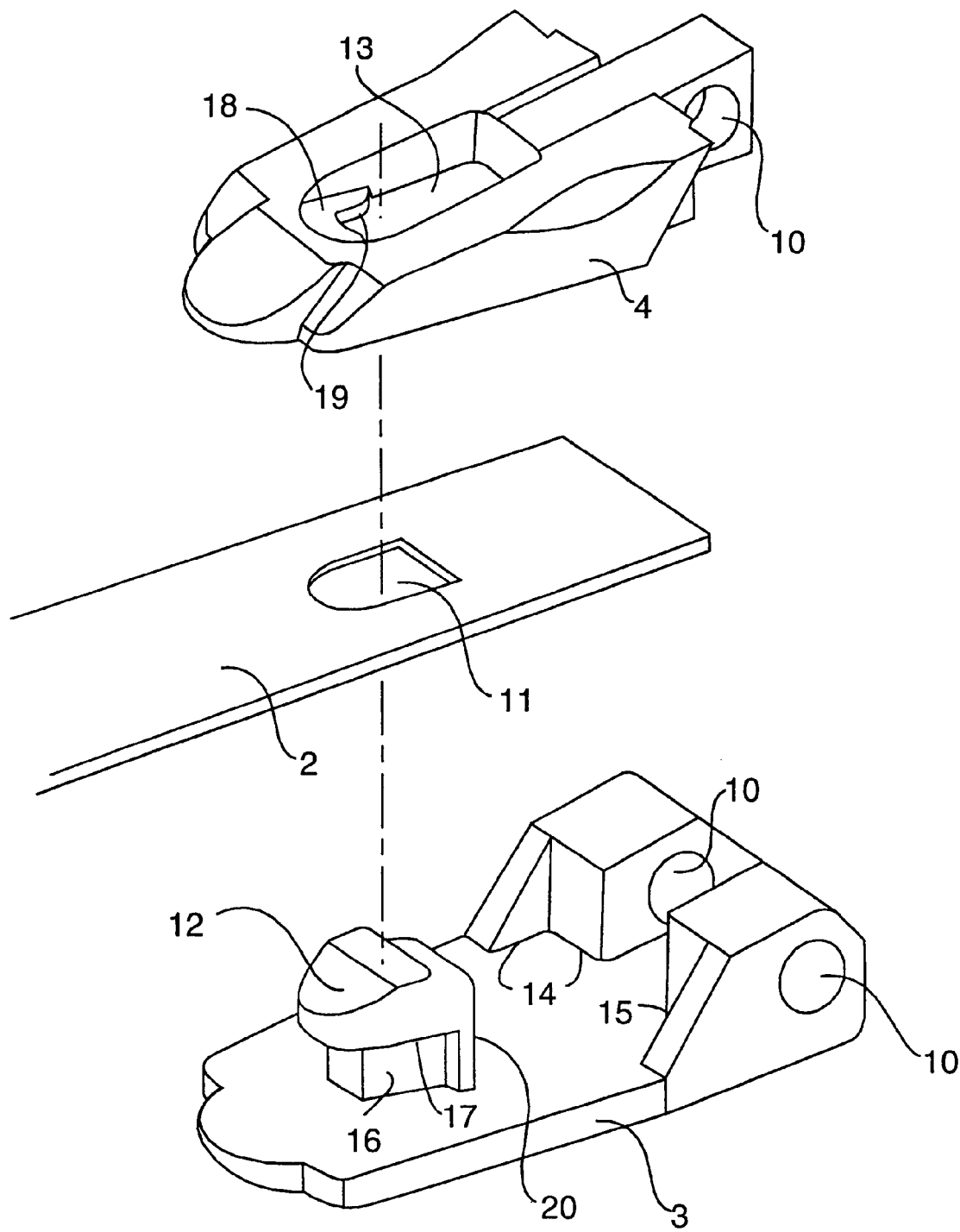
FIG. 3 is an exploded, perspective bottom view of the measuring tape and the at least substantially plate-shaped parts of the device of FIG. 1.

In order to cause the free end of measuring tape 2 to be retained between upper and lower plate 3,4 without any essential parts being deformed, upper plate 3 is provided with a cam 12 which can be inserted into an opening 11 in measuring tape 2. The cam in the assembled condition furthermore extending through an opening 13 in lower plate 4 (FIG. 3). In this condition the free end of measuring tape 2 butts against contact surfaces 14, 15, thus ensuring that measuring tape 2 will remain retained between plates 3,4 in a dimensionally stable manner for the entire life of the device 1. This dimensional stability is in particular realised because the contact surfaces 14, 15 and the opposite contact surface 20 of cam 12 are positioned on the circumference of an imaginary triangle. As is shown in FIG. 3, cam 12 is configured to have a centering or positioning surface 16 and a wedging surface 17, whose function will be explained in more detail below with reference to FIGS. 4, 5, 6 and 7.

Figure 4:
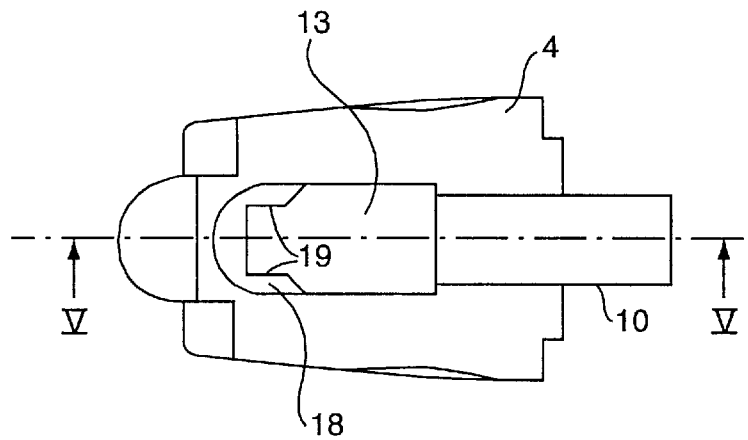
FIG. 4 is a schematic plan view of one at least substantially plate-shaped part of the device of FIG. 1.
Figure 5:
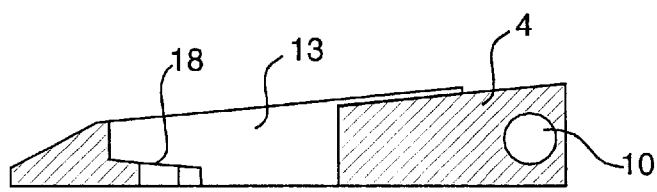
FIG. 5 is a schematic, at least partially cutaway side view along line V—V of said part of FIG. 4.

FIG. 4 is a schematic plan view of lower plate 4, wherein the edge of opening 13 has a wedging surface 18 corresponding with wedging surface 17 of cam 12 provided on upper plate 3. In the assembled condition of device 1 wedging surface 18 mates with the wedging surface of cam 12. More in particular, when the lower plate 4 is being fitted on upper plate 3 said lower plate will at the same time be pushed forwards, in the direction of hole 10 in upper plate 3, as well as downwards by the mating wedging surfaces 17, 18, thus effecting a satisfactory clamping action between the two plates 3,4. The edge of opening 13 forms a fork-shaped member, as it were, at the location of the wedging surface. FIG. 5 is a partially cutaway side view of lower plate 4 of FIG. 4, seen along line V—V. Also in this Figure those parts that correspond with parts shown in preceding Figures are indicated by the same numerals, and the same applies to FIGS. 6 and 7, which will be discussed below.

Figure 6:
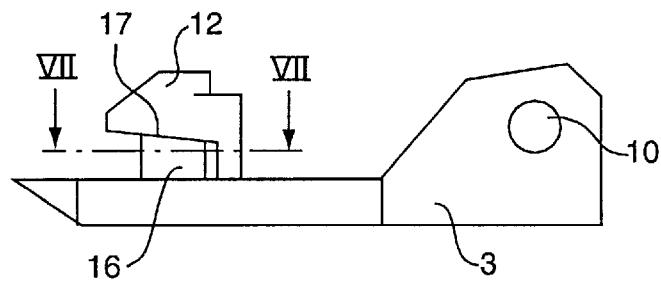
FIG. 6 is a schematic side view of the other at least substantially plate-shaped part of the device shown in FIG. 1.
Figure 7:
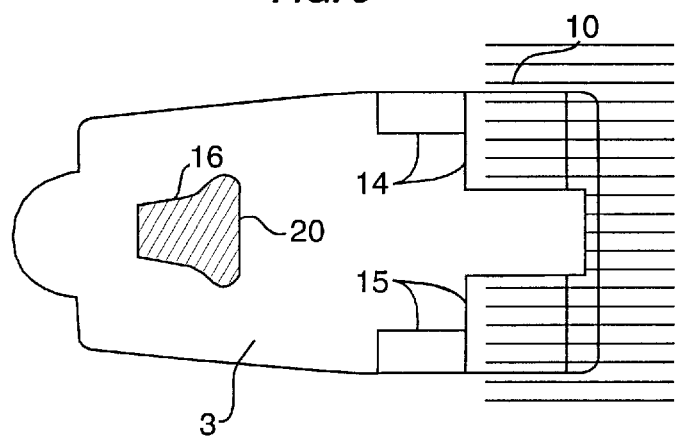
FIG. 7 is a schematic, partially cutaway plan view of said part of FIG. 6 (partially along line VII—VII).

FIG. 6 is a side view of upper plate 3, which clearly shows the wedge shape, that is, the downward slope of the wedging surface 17 in the direction of hole 10 in FIG. 6. This also applies, mutatis mutandis, to the wedge-shaped centering or positioning surface 16 as shown in FIG. 7. In FIG. 7 surface 16 widens laterally towards hole 10. When the plates 3,4 are fitted together the centering or positioning surface 16 of cam 12 will mate with a corresponding centering or positioning surface 19 of the aforesaid fork-shaped member. This ensures a correct positioning of the two plates 3,4 relative to each other. It is noted that upper and lower plates 3,4 are preferably entirely made of plastic material, as a result of which there will be hardly any shrink (as known with other materials), if at all, so that the respective axes of holes 10 of all parts (cf. FIG. 2) will be in line. As a result of the above-described wedging action an excellent matching of the free end of measuring tape 2 between upper and lower plates 3,4 is ensured. If there should be a small amount of play after all, this will be eliminated by the wedging action upon insertion of the pivot pin 6 into holes 10. Pivot 6 has been manufactured by an extrusion process rather than by a turning operation which should help to reduce the occurrence of variations.

It is noted that the present invention is not limited to the preferred embodiment discussed with reference to the Figures, but that it also extends to other variants. In this connection it may for example be considered to glue the two plates 3,4 together instead of clamping them together by means of the above-described wedging action.

What is claimed is:

1. A measuring tape assembly, comprising:
    a) a measuring tape having a longitudinal axis and having a free end having an endface, said measuring tape further having a hole therethrough proximate said free end, said hole having a forward edge;
    b) a first plate-shaped part;
    c) a second plate-shaped part mated to said first plate-shaped part with the measuring tape secured therebetween, said second plate-shaped part including a protrusion extending through said hole and at least one contact wall disposed substantially perpendicular to said tape and spaced from said protrusion, said protrusion having a proximal portion, a distal portion, and a medial portion relative to said second plate-shaped part, said contact surface abutting said endface of said free end and said protrusion abutting said forward edge of said hole, wherein at least said distal and medial portions of said protrusion are sized to fit through said hole; and
    d) said protrusion and said contact wall fixably locating said second plate-shaped part relative to said endface of said measuring tape.

2. The assembly of claim 1 wherein said second plate-shaped part includes at least a first and a second contact walls disposed substantially perpendicular to said tape and spaced from said protrusion and wherein said first and second contact walls abut said endface of said free end.

3. The assembly of claim 2 wherein said first and second contact walls and the portion of said protrusion abutting said forward edge of said hole of said tape generally form a triangle.

4. The assembly of claim 2 wherein said first and second contact walls are generally co-planar.

5. The assembly of claim 1 wherein said protrusion includes a cam adapted to be inserted through said hole and wherein said first plate-shaped part includes a opening adapted to fixably receive the portion of the cam extending through said hole.

6. The assembly of claim 1 further including means for joining said second plate-shaped part with said first plate-shaped part without damaging said tape.

7. The assembly of claim 1 wherein said first plate-shaped part and said second plate-shaped part trap said tape therebetween such that said tape is prevented from breaking contact with said protrusion and said first contact wall.

8. The assembly of claim 1 wherein said first contact wall and the portion of said protrusion abutting said forward edge are substantially parallel.

9. The assembly of claim 1 wherein said first plate-shaped part and said second plate-shaped part include alignment holes and further including a pivot rod extending through said alignment holes, said pivot rod disposed generally parallel to said tape and beyond the farthest forward portion of said tape.

10. The assembly of claim 9 wherein said first plate-shaped part and said second plate-shaped part are joined only through said pivot rod and said protrusion.

11. The assembly of claim 1 wherein said hole has a substantially straight forward edge and wherein said protrusion includes a substantially straight contact surface abutting said forward edge and parallel to said at least one contact wall.

12. A measuring tape assembly, comprising:
   a) a measuring tape having a longitudinal axis and having a free end having an endface, said measuring tape further having a hole therethrough proximate said free end, said hole having a forward edge;
   b) a first plate-shaped part;
   c) a second plate-shaped part mated to said first plate-shaped part with the measuring tape secured therebetween, said second plate-shaped part including locating means for locating said second plate-shaped part relative to said free end of said measuring tape;
   d) said locating means including a protrusion extending through said hole and at least one contact wall disposed substantially perpendicular to said tape and spaced from said protrusion, said protrusion sized along its entire length to fit through said hole; and
   e) said contact wall abutting said endface of said free end and said protrusion abutting said forward edge of said hole.

13. The assembly of claim 12 further including means for joining said second plate-shaped part with said first plate-shaped part without damaging said tape.

14. The assembly of claim 12 wherein said first plate-shaped part and said second plate-shaped part include alignment holes and further including a pivot rod extending through said alignment holes, said pivot rod disposed generally parallel to said tape and beyond the farthest forward portion of said tape.

15. The assembly of claim 14 wherein said first plate-shaped part and said second plate-shaped part are joined only through said pivot rod and said protrusion.

16. The assembly of claim 12 wherein said protrusion includes a cam adapted to be inserted through said hole and wherein said first plate-shaped part includes a opening adapted to fixably receive the portion of the cam extending through said hole.

17. A measuring tape assembly, comprising:
   a) a measuring tape having a longitudinal axis and having a free end having an endface;
   b) a first plate-shaped member;
   c) a second plate-shaped member;
   d) means for both aligning said endface relative to said second plate-shaped member and for joining said first plate-shaped member to said second plate-shaped member.

18. The assembly of claim 17 wherein said first plate-shaped member is permanently mated to said second plate-shaped member without deforming said means and without deforming said measuring tape.

* * * * *